United States Patent [19]

Stepanian et al.

[11] Patent Number: 5,224,566

[45] Date of Patent: Jul. 6, 1993

[54] DRIVING UNDER THE INFLUENCE PREVENTION, AND METHODS OF CONSTRUCTING AND UTILIZING SAME

[76] Inventors: Gary L. Stepanian, 4918 Driftwood Dr., Milford, Mich. 48382; David M. Augspurger, 6600 Valley Spring Dr., Birmingham, Mich. 48010; Robert D. Shimmin, 300 Riverfront 21-K, Detroit, Mich. 48226

[21] Appl. No.: 691,233

[22] Filed: Apr. 25, 1991

[51] Int. Cl.⁵ .............................................. B60K 28/06
[52] U.S. Cl. .................... 180/272; 180/287; 340/576; 340/543; 123/198 D
[58] Field of Search ......... 180/272, 271, 287; 128/745; 123/198, 198 R, 198 B, 198 D; 340/576, 543; 307/10.2, 10.3-10.5, 10.6

[56] References Cited

U.S. PATENT DOCUMENTS

| | | | |
|---|---|---|---|
| 3,755,776 | 8/1973 | Kotras | 180/272 X |
| 3,913,086 | 10/1975 | Adler et al. | 180/272 X |
| 4,158,198 | 6/1979 | Ochiai | |
| 4,276,546 | 6/1981 | Krass | |
| 4,546,266 | 10/1985 | Zenick et al. | |
| 4,645,939 | 2/1987 | Robinson | |
| 4,723,625 | 2/1988 | Komlos | |
| 4,738,333 | 4/1988 | Collier et al. | |

*Primary Examiner*—David H. Bollinger
*Attorney, Agent, or Firm*—Irving M. Weiner; Joseph P. Carrier; Pamela S. Burt

[57] ABSTRACT

The present invention relates to a method and apparatus for preventing an impaired person from operating a vehicle. The method includes a means for evaluating the level of the necessary skills for the safe operation of motorized vehicles, including automobiles, watercraft, aircraft and machinery. Once this level is determined on an individual basis, before operation of the motorized vehicle can be effected, each individual must match or surpass the safety level for enabling the ignition of the device. If the individual is impaired such as by drugs or alcohol use, the evidence is retained and the ignition disabled to prevent operation of the motorized vehicle. The apparatus includes an electronic module necessary to activate a test routine or program which also records the time, identity of the user, the number of times passed or failed and any attempts to tamper with our circumvent the system.

17 Claims, 7 Drawing Sheets

1a

1b

DRIVING UNDER THE INFLUENCE PREVENTION, AND METHODS OF CONSTRUCTING AND UTILIZING SAME

BACKGROUND OF THE INVENTION

1. Field of the Invention

The present invention relates to a method and apparatus for preventing an impaired person from operating a vehicle. The method includes a means for evaluating the level of the necessary skills for the safe operation of motorized vehicles, including automobiles, watercraft, aircraft and machinery. Once this level is determined on an individual basis, before operation of the motorized vehicle can be effected, each individual must match or surpass the safety level for enabling the ignition of the device. If the individual is impaired, such as by drugs or alcohol use, the evidence is retained and the ignition disabled to prevent operation of the motorized vehicle.

The apparatus includes an electronic module necessary to activate a test routine or program which also records the time, identity of the user, the number of times passed or failed and any attempts to tamper with or circumvent the system.

2. Description of the Relevant Art

The safe operation of a motorized device requires that the operator be in the proper mental and physical condition. An operator who is impaired is extremely dangerous and may cause injuries to other persons and/or damage property.

Previously, blood alcohol levels were used to determine the ability of a driver to safely operate a vehicle. However, it has been found that individuals react differently to alcohol and thus it is preferred that the ability to perform complex tasks be tested.

The concept of testing the performance ability of the potential vehicle operator is not new. The previous devices were inadequate in that they were not driver specific, they could not store historical date, the tests were unreliable and the level of tamper-proofing was insufficient. Other factors which limited the effectiveness of the previous devices are that the software technology was insufficient, driver acceptance of digital devices was low and cost effective displays were not available.

U.S. Pat. No. 4,158,198 discloses an apparatus for evaluating a driver in which "steady control task" is imposed on the driver for a designated period of time. A sensing circuit is provided in a brake line to determine the force exerted by the operator.

U.S. Pat. No. 4,738,333 discloses a system for identifying and testing the alcohol-level of the driver. A breath sobriety test and physical tasks, to confirm identity of the driver, are performed as criteria for enabling the ignition.

U.S. Pat. No. 4,723,625 discloses a testing devices for determining if the users reflexes are impaired. A series of test buttons are randomly illuminated and the reflex time recorded and compared against a previously input normal reflex time.

U.S. Pat. No. 4,645,939 discloses a device for testing the reflexes by following a sequence of timed intervals. Failure to complete these interval prevents operation of the vehicle.

U.S. Pat. No. 4,546,266 discloses the use of a magnet to enable the ignition system of the vehicle.

U.S. Pat. No. 4,276,546 discloses an apparatus for testing if a persons motor skills are impaired.

The present invention provides a method and apparatus for testing the ability of a potential driver and storing the individual drivers record such that the data may be analyzed by experts.

SUMMARY OF THE INVENTION

The present invention provides a method and apparatus for determining the abilities of the potential driver.

The apparatus includes a key which stores driver-specific information such as: individual test characteristics; password; driver historic data; renewal expiration date; emergency override count; payment information; and tampering information. The key is required to perform appropriate tests that are stored in a test module's memory.

The tests which may be used to evaluate the ability of the driver include the random number recall test, the dual column light bar test and/or the match outer edge test.

If the driver is unable to pass the required test, he or she must wait until the device retests the individual. The retest time interval is initially short but increases greatly after the second failed attempt. Preferably, after three successive failures, a new attempt can only be made once every half hour.

A major advancement achieved with the use of the present invention is the adaptability of the test procedure to each individual's characteristics. The removable memory device or key stores the level of difficulty to be used when testing that individual.

It is an object of the present invention to provide a means for testing the ability of an individual to safely operate a motor vehicle.

It is a further object of the present invention to provide an impairment detection device which adapts to the individual driver.

Still another object of the present invention is to provide a device which records each individual's driving record.

Yet another object of the present invention is to provide an impairment testing device which also prevents theft of motor vehicles.

The above and further objects, details and advantages of the invention will become apparent from the following detailed description, when read in conjunction with the accompanying drawings.

DETAILED DESCRIPTION OF THE PREFERRED EMBODIMENTS

Figure 3:
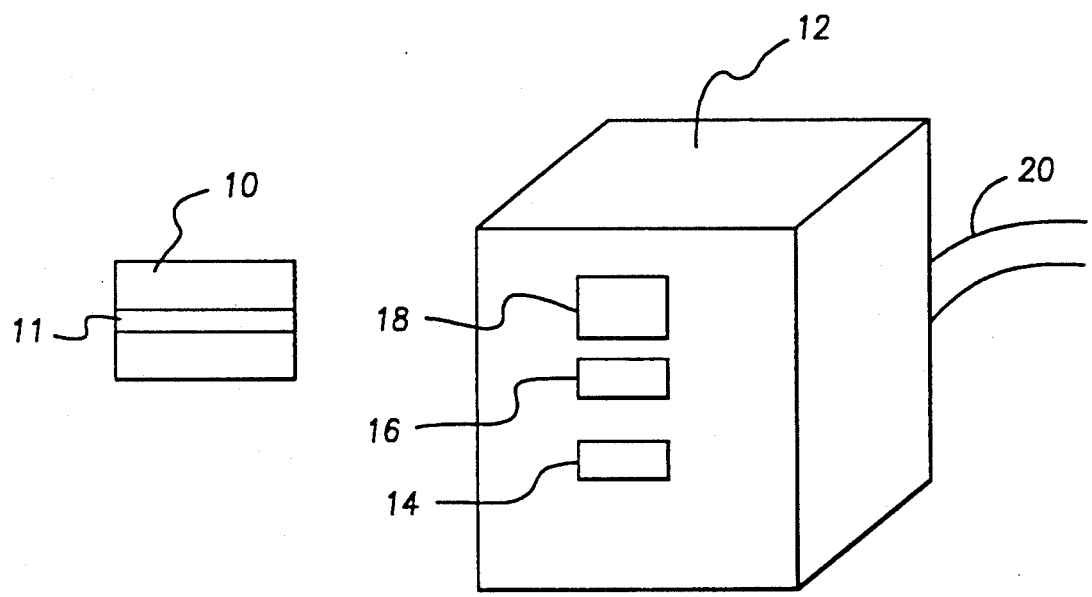
FIG. 3 illustrates the key and control module in accordance with the present invention.

As shown in FIG. 3, the apparatus of the present invention generally comprises a key 10 and test module 12. Key 10 comprises a personal memory device which has stored thereon the test characteristics for the individual. In addition, a password may be stored thereon for theft prevention purposes. Key 10 may resemble a credit card with a magnetic storage strip 11 and would be accepted in slot 14 in module 12. Preferably, key 10 comprises a recording device similar in size to a current car key. Keypad 16 may be utilized for the input of a password, test information, or emergency override information. Display area 18 is used to display the particular test which must be satisfactorily performed for the ignition to be activated and preferably comprises a CRT.

In use, a driver inserts the key 10 into slot 14 and is required to perform the appropriate test(s) that are stored in module 12 and displayed in area 18. Personal test characteristics are inputted to the test programs (note FIG. 2). This permits the apparatus to differentiate the persons normal test performance from an "impaired" test performance. Module 12 is preferably a microprocessor of known construction and of the type commonly used in automobile control systems at this time.

A deficiency in previous system is the ability to prevent substitute people from taking the performance test for the driver. The present invention monitors all wiring to prevent tampering therewith. Any tampering or attempt to substitute a driver is recorded on the key 10. It may be required to periodically replace key 10 with a new valid key. At that time, any attempts to tamper with the system can be noted by an official, such as a State agency, and punishment, such as fines, levied.

Module 12 is interconnected with the motor vehicle by ignition enabling means, such as wires 20.

The performance test displayed on display area 18 are designed to measure the drivers ability to safely operate the motor vehicle. It may be required to pass one or more of these tests or a test program before the ignition is activated.

A first test comprises a random number recall. A random number generator in module 12 will generate a sequence of random numbers which will be quickly displayed to the driver in display area 18. The driver must then input the numbers exactly in a limited amount of time by using keyboard 16.

A second test comprises the Divided Attention/Dual Column test. This test includes the illumination of a pair of "light bars" in display area 18. Each bar will be illuminated from one end with a random number of lights. The driver will then have to use two controls (perhaps provided in keypad 16) to align two other corresponding light bars the same length or number of lights. Response time will be a major factor in determining satisfactory performance of this test. This test may also be repeated several times to permit evaluation of the level of impairment.

A third test comprises the matching of the outer edge of light bars. The driver is required to match opposite edges of a light bar a "target" block located immediately above the light bar. This test requires divided attention and tracking dexterity. The test may be best illustrated as shown in Example 1 below.

Example 1:

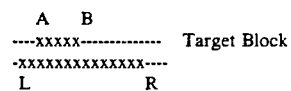 Target Block

The driver must move edge "L" toward the right until it aligns with point "A" on the target block. At the same time, the driver must move edge "R" until it aligns with point "B".

This may be accomplished by depressing two buttons, one labelled "L" and the other labelled "R" on the keypad 16. This can best be illustrated by Example 2 shown below.

Example 2:

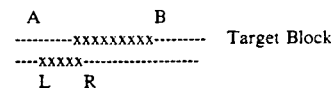 Target Block

In this example, the driver must move both the "L" and "R" edges to the right, but the "L" button must be released earlier than the "R" button since the "R" edge must travel faster to align with point "B" on the Target Block. If the "L" button is depressed too long, the "L" edge will pass point "A" on the target block and the test will be judged as being unsatisfactorily performed.

This test clearly indicates a drivers (1) impairment of eye/hand coordination, (2) blurred vision, (3) mental awareness and (4) general coherence.

Figure 1:
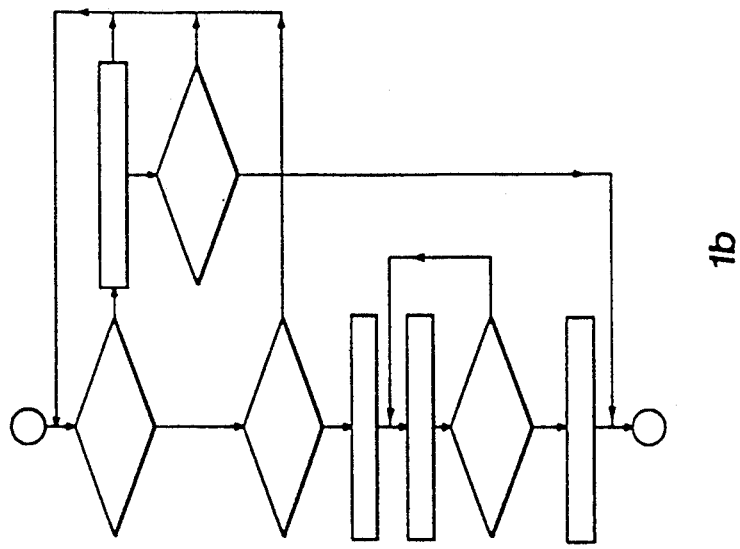
FIG. 1 illustrates a flow chart of the operation of the testing system.
Figure 1:
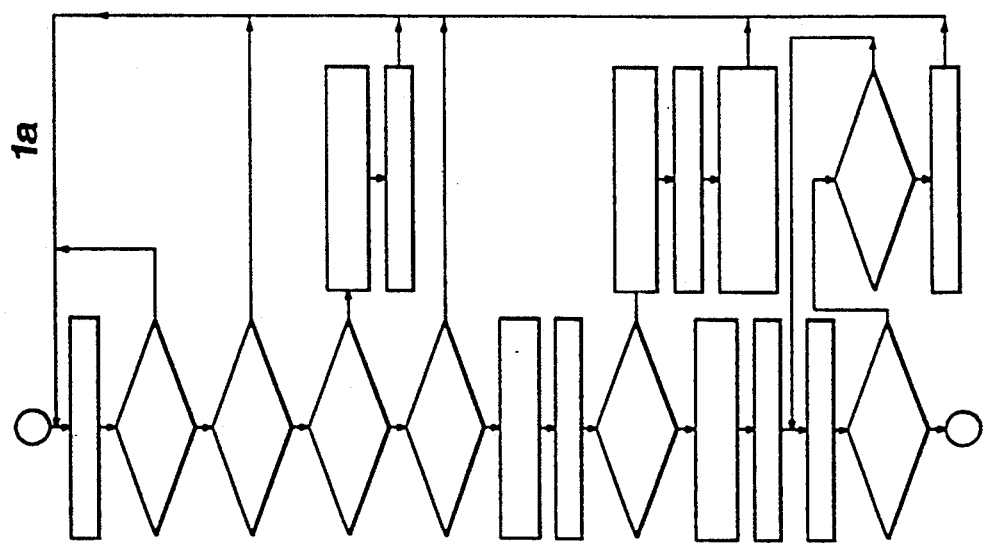
Figure 1A:
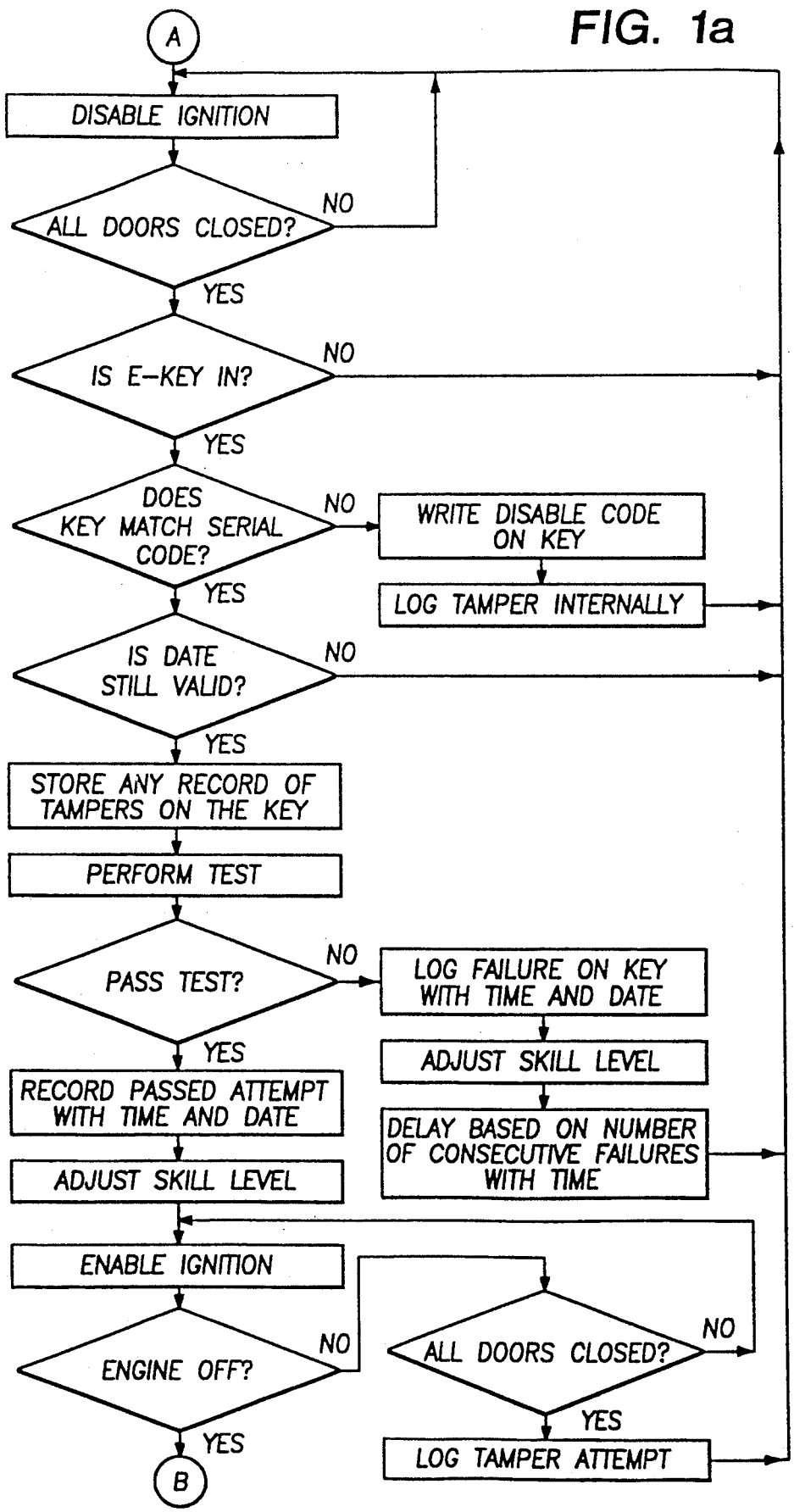
Figure 1B:
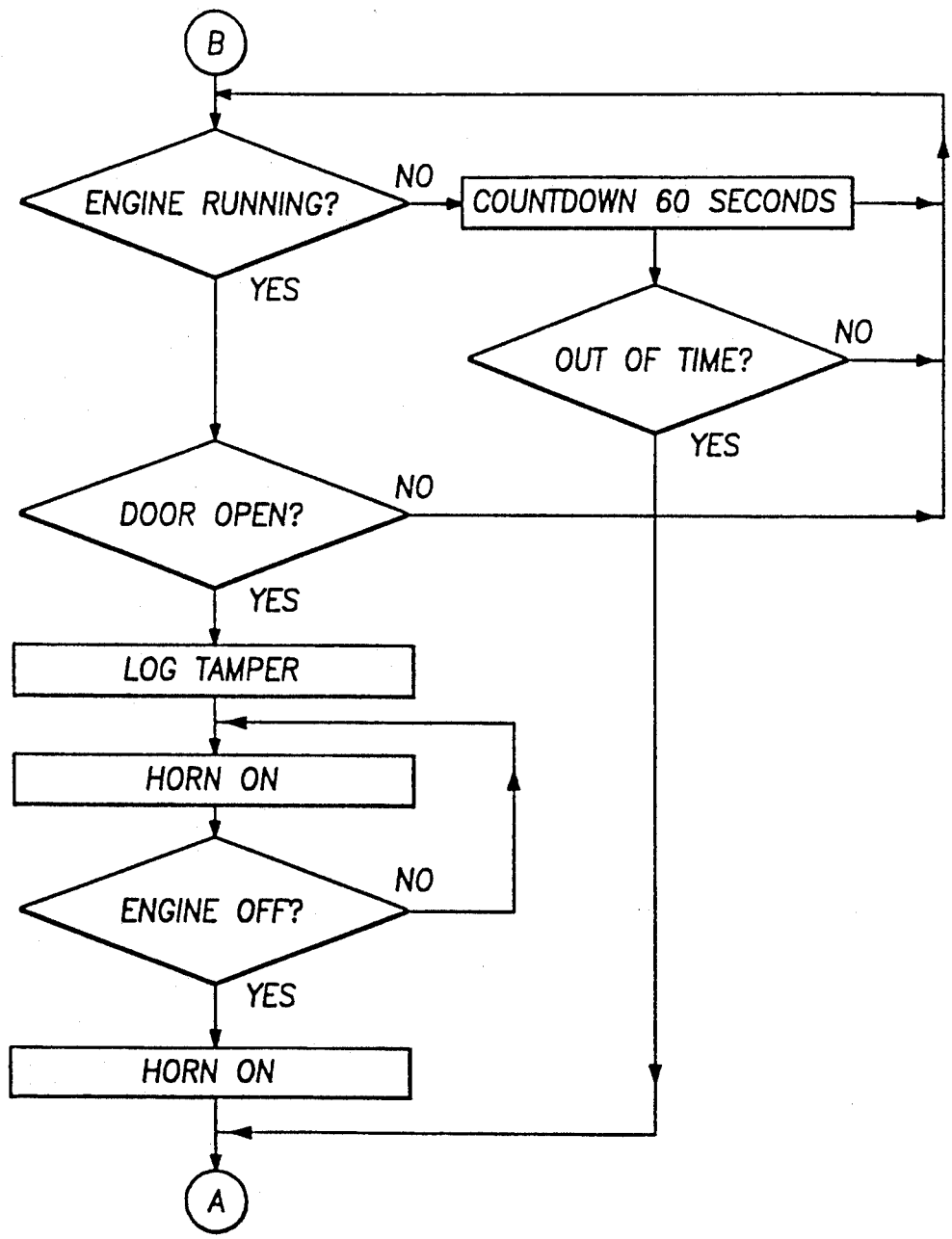

To prevent the unauthorized substitution of a driver, the doors of the vehicle are monitored. The means for monitoring the door position is well known and currently used to illuminate "DOOR AJAR" warning lights. If a door is opened before the performance test, the horn is sounded until the door is closed and the incident recorded on the Key 10. As shown in the flow chart of FIG. 1, if the door is opened after a successful test, the incident is recorded on Key 10 and the driver may have to reenter the test phase of the process, if so desired.

With the inclusion of a password to the above described method, the present invention could also act as a theft deterrent and ensure the identity of the operator.

Figure 2:
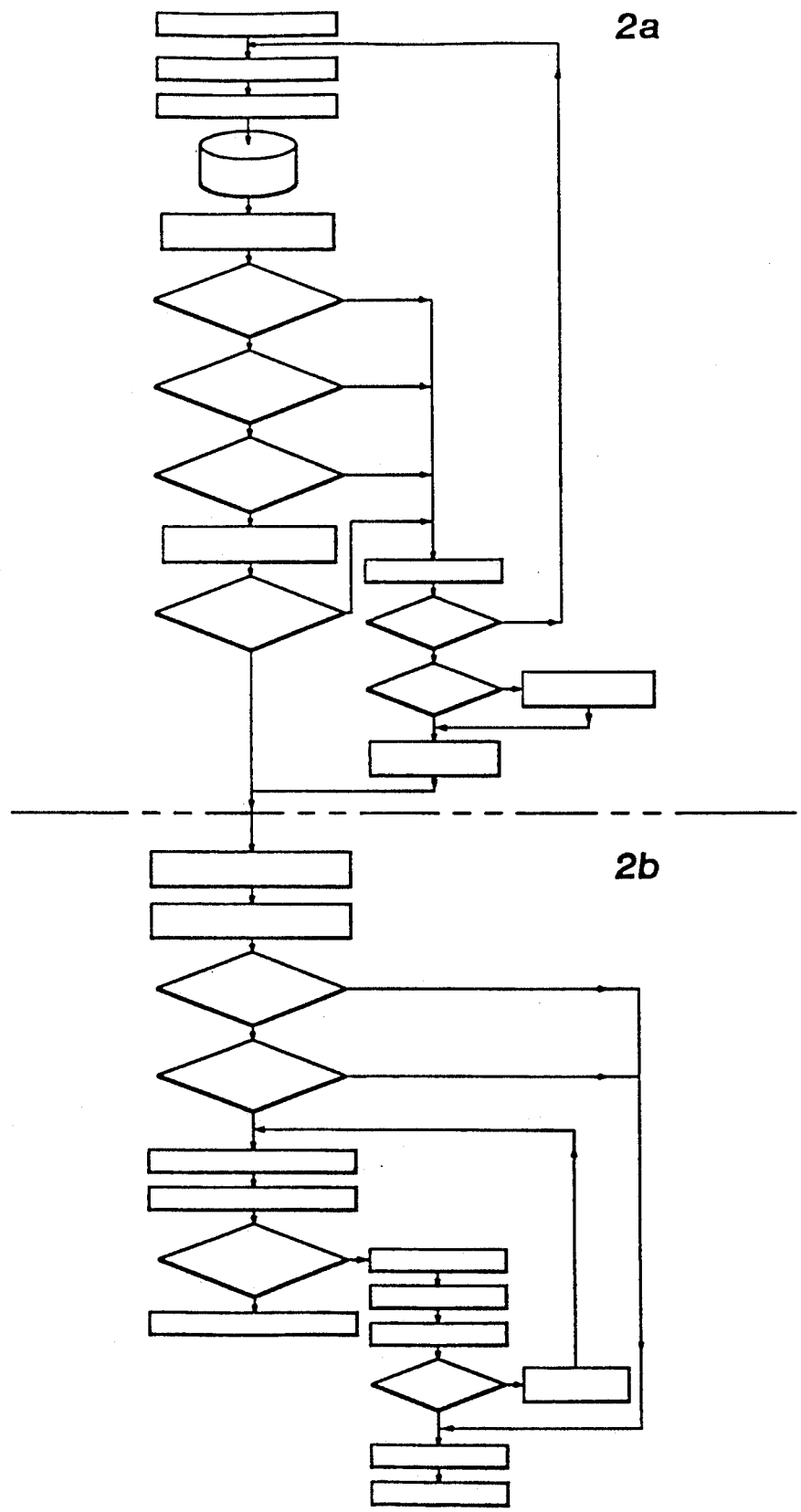
FIG. 2 illustrates a flow chart of the operation of the key record review and issuance.
Figure 2A:
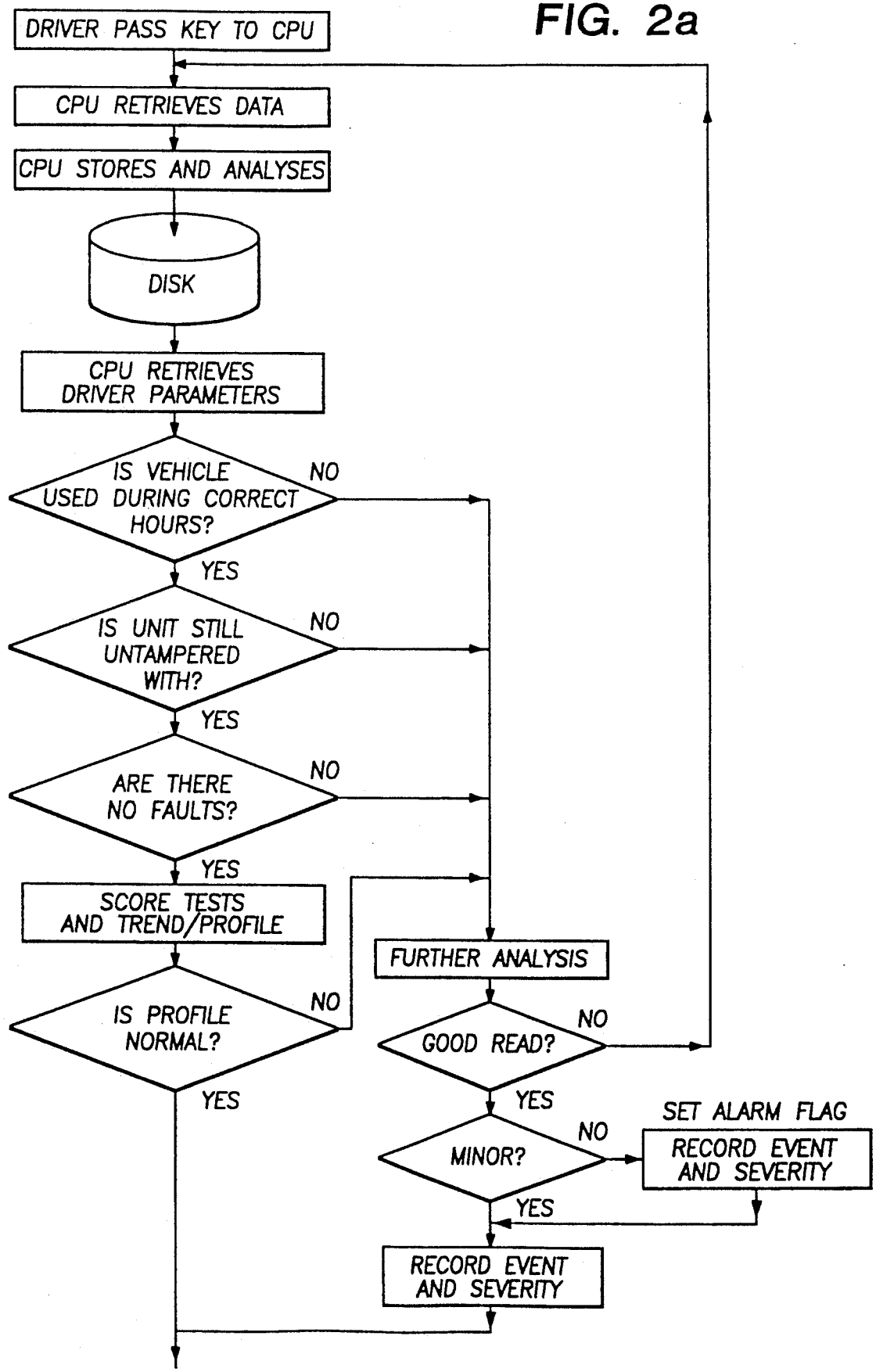
Figure 2B:
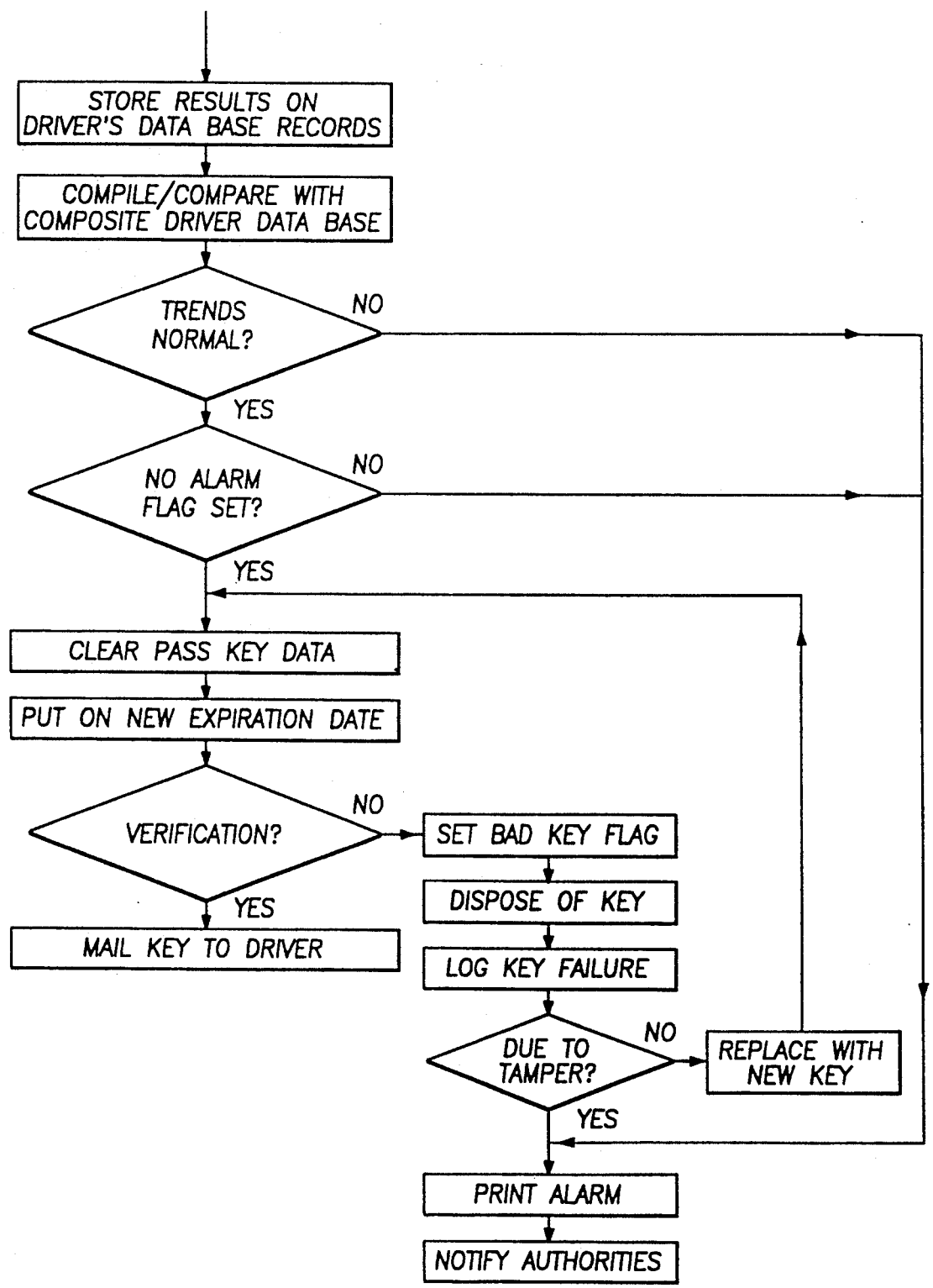

As illustrated in the flow chart of FIG. 2, the key 10 is configured at the time of purchase by a device which determines the individual's ability to pass the test(s) and records the difficulty level on key 10. This is advantageous in that the test(s) is/are set for the individual, taking into consideration the age and physical abilities of the individual.

The key 10 may also record the number of times the car is started, the number of failures, the number of attempts to bypass the system, etc. The key 10 may also be set to expire at a certain time or day so that it cannot be used beyond that time, preventing the use of the vehicle. The user may be required to periodically return the key 10 for a new valid key, the key being reviewed by a State agency or Judicial official and the record added to the individual's driver record.

Although there has been described what are at present considered to be preferred embodiments of the present invention, it will be understood that various modifications and variations may be made therein, and it is intended to cover in the appended claims all such modifications as fall within the true spirit and scope of the invention.

I claim:

1. A method for preventing impaired operators of motorized vehicles by providing a motor-skill testing device, said method comprising:
   recording the normal motor-skill test for the individual operator on a key recording device;
   providing a motor-skill testing device in a motorized vehicle the ignition of said motorized vehicle controlled by said testing device;
   inserting said key recording device into said testing device, a test program activated and the performance of the individual monitored to measure the individuals ability to safely operate said vehicle;

comparing said performance and said motor skill test;

monitoring of the condition of the vehicle door is conducted to prevent substitution of operators; and activating said ignition upon satisfactory completion of said test program.

2. The method of claim 1, wherein:

inserting a password is required to ensure the operators identity.

3. The method of claim 1, wherein:

said motor-skill testing device providing a delay period between attempts to pass said test program, said delay period increasing with each failed attempt.

4. The method of claim 1, wherein:

recording the results of said test program on said key recording device.

5. The method of claim 1, wherein:

recording any attempts to circumvent said method on said key recording device.

6. A method for preventing the unsafe operation of a motorized vehicle by an impaired operator comprising:

recording normal motor-skill test results for an operator on an individualized key recording device;

inserting said key recording device in a motor skill testing module installed in said motorized vehicle;

monitoring the position of the vehicle doors to prevent substitution of the operator;

activating a test program for determining the motor-skill abilities of said operator and obtaining the results of said test program;

comparing said results with said normal motor-skill test result for measuring the operators ability to safely operate said vehicle; and activating the ignition system of said vehicle upon satisfactory completion of said test program.

7. The method of claim 6, wherein:

delaying a new attempt to satisfactorily complete said test program in a set time period, the time period increases with each attempt to complete the said program.

8. The method of claim 6, wherein:

said test program comprises the testing of the divided attention and tracking dexterity of the operator.

9. The method of claim 6, wherein:

said test program comprises the testing of eye/hand coordination, vision and mental awareness.

10. An apparatus for preventing the unsafe operation of a motor vehicle by an impaired operator, comprising:

a recording device including the individual operators normal motor skill test results electronically stored thereon;

a test module comprising a microprocessor including a recording device reader, a keypad, a test program delay are and means for enabling ignition;

a test program electronically stored in said test module having means for displaying a motor skills test on said display are, means for comparing the results thereof with the test results stored on said recording device and with means for determining the ability of said operator to safely operate said vehicle; and said test module further including means for monitoring the position of the vehicle doors to prevent substitution of said operator.

11. The apparatus of claim 10, wherein:

said test module includes means for storing on said recording device all attempts to operate said vehicle.

12. The apparatus of claim 10, wherein:

said test module includes means for disabling said ignition system until a satisfactory test result is achieved.

13. The apparatus of claim 10, wherein:

said keypad comprises a means for inputting responses to said test program.

14. The apparatus of claim 10, wherein:

said test module means for delaying a new attempt to satisfactorily respond to said test program.

15. The apparatus of claim 10, wherein:

said test program includes means for evaluating-in its place the physical and mental impairment of said operator to determine the operators ability to safely operate said vehicle.

16. The apparatus of claim 10, wherein:

said test program includes a random number generator, random numbers displayed on said display area and the speed and accuracy of the operators ability to input the same random numbers evaluated against the normal speed and accuracy stored on said recording device.

17. The apparatus of claim 10, wherein:

said test program includes light generating means for displaying on said display area a pair of light bars;

said operator matching the size of said light bars on a similar pair of light bars by utilizing controls on said keypad; and the speed and accuracy of said operator compared with the normal test results stored on said recording device for evaluating the operators ability to safely operate said vehicle.

* * * * *

UNITED STATES PATENT AND TRADEMARK OFFICE
CERTIFICATE OF CORRECTION

PATENT NO. : 5,224,566
DATED : July 6, 1993
INVENTOR(S) : Stepanian et al.

Page 1 of 2

It is certified that error appears in the above-indentified patent and that said Letters Patent is hereby corrected as shown below:

Title page, item [57],
In the Abstract, line 16, change "our" to --or--.

Column 1, line 41, change "date" to --data--;
Column 1, line 58, change "devices" to --device--.

Column 3, line 17, change "system" to --systems--; change "ability" to --inability--;
Column 3, line 28, change "test" to --tests--;
Column 3, line 29, change "drivers" to --driver's--.

Column 4, line 17, change "drivers" to --driver's--;
Column 4, line 50, change "driver" to --driving--;
Column 4, line 65 (claim 1, line 7), after "vehicle" (first occurrence) add a comma; after "vehicle" (second occurrence) insert --being--.

Column 5, line 2 (claim 1, line 12), change "individuals" to --individual's--;
Column 5, line 11 (claim 2, line 3), change "tors" to --tor's--;
Column 5, line 36 (claim 6, line 13), change "operators" to --operator's--.

Column 6, line 1 (claim 10, line 3), change "operators" to --operator's--;
Column 6, line 6 (claim 10, line 8), delete "delay are" and insert --display area--;
Column 6, line 8 (claim 10, line 10), change "skills" to --skill's--;
Column 6, line 9 (claim 10, line 11), change "are," to --area,--;
Column 6, lines 32-33 (claim 15, lines 2-3), delete "-in its place";
Column 6, line 34 (claim 15, line 4), change "operators" to --operator's--;
Column 6, line 39 (claim 16, line 4), change "operators" to --operator's--;
Column 6, line 51 (claim 17, line 9), change "operators" to --operator's--.

UNITED STATES PATENT AND TRADEMARK OFFICE
CERTIFICATE OF CORRECTION

PATENT NO. : 5,224,566
DATED : July 6, 1993
INVENTOR(S) : Stepanian, et. al.

It is certified that error appears in the above-indentified patent and that said Letters Patent is hereby corrected as shown below:

Column 6, line 51 (claim 17, line 9), change "operators" to --operator's--.

Signed and Sealed this

Fifth Day of April, 1994

*Attest:*

BRUCE LEHMAN

*Attesting Officer*  *Commissioner of Patents and Trademarks*